(12) United States Patent
Dudaney

(10) Patent No.: US 6,360,169 B1
(45) Date of Patent: Mar. 19, 2002

(54) SYSTEM FOR DETERMINING AND TRACKING CHANGES IN LOCATION

(76) Inventor: Umesh Dudaney, 8527 Mahogany Pl., Newark, CA (US) 94560

( * ) Notice: Subject to any disclaimer, the term of this patent is extended or adjusted under 35 U.S.C. 154(b) by 0 days.

(21) Appl. No.: 09/657,099

(22) Filed: Sep. 7, 2000

(51) Int. Cl.[7] ............ G01C 21/00; G01S 5/00; G01S 13/00; G01S 17/00; G06F 7/00; G06F 17/00; G06F 19/00

(52) U.S. Cl. .............. 701/213; 701/200-212; 701/214; 701/215; 240/988; 240/989; 240/990; 240/995; 342/357.01; 342/357.02; 342/357.09; 342/357.13; 705/5; 705/417; 705/418; 705/400; 709/218; 709/217; 709/219

(58) Field of Search ............... 701/200-215, 701/220; 340/990, 995, 988, 989; 342/357.02, 357.01, 357.09, 357.13; 705/5, 417, 418, 400; 709/218, 217, 219

(56) References Cited

U.S. PATENT DOCUMENTS

| | | | |
|---|---|---|---|
| 5,546,092 A | | 8/1996 | Kurokawa et al. .......... 342/357 |
| 5,908,465 A | * | 6/1999 | Ito et al. .................. 701/211 |
| 5,928,308 A | * | 7/1999 | Nanba et al. .............. 701/211 |
| 5,948,040 A | * | 9/1999 | DeLorme et al. .......... 701/201 |
| 5,983,158 A | * | 11/1999 | Suzuki et al. ............. 701/209 |
| 6,115,668 A | * | 9/2000 | Kaneko et al. ............ 701/207 |
| 6,115,669 A | * | 9/2000 | Watanabe et al. ......... 701/209 |
| 6,144,318 A | * | 11/2000 | Hayashi et al. ........... 340/995 |
| 6,202,026 B1 | * | 3/2001 | Nimura et al. ............ 701/211 |

* cited by examiner

Primary Examiner—William A. Cuchlinski, Jr.
Assistant Examiner—Ronnie Mancho
(74) Attorney, Agent, or Firm—Burns, Doane, Swecker & Mathis L.L.P.

(57) ABSTRACT

A handheld locator device is prompted to determine and store a first, Home location, and to determine a Return location, and to visually display the relative positions of the Home and Return locations. An input device, for example having one or more push button keys, is pressed by the operator and causes a GPS determined the Home and Return locations. Intermediate locations are also determined, automatically and at predetermined intervals. A curve showing the relative positions of the Home and Return locations is displayed, along with a constantly updated arrow corresponding to the most recent intermediate location. An elevation arrow showing the relative elevations between the Home and Return is also displayed.

11 Claims, 4 Drawing Sheets

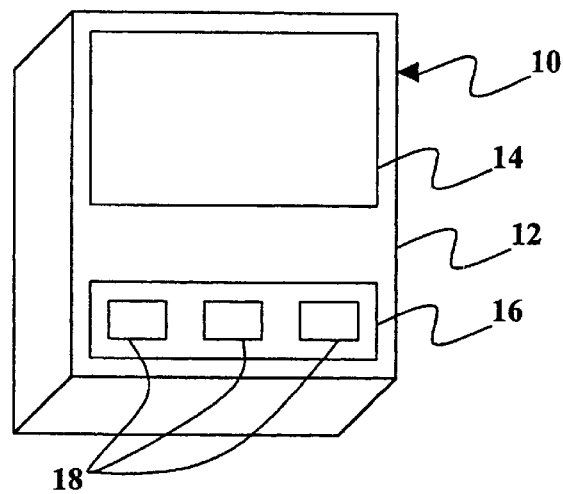
FIG._1
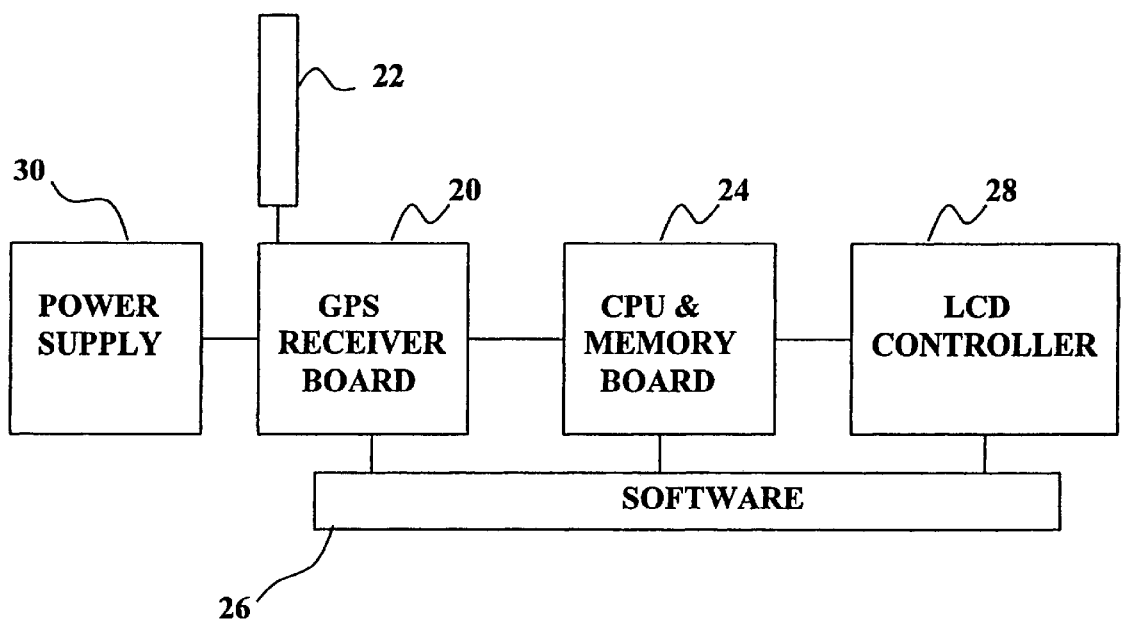
FIG._2

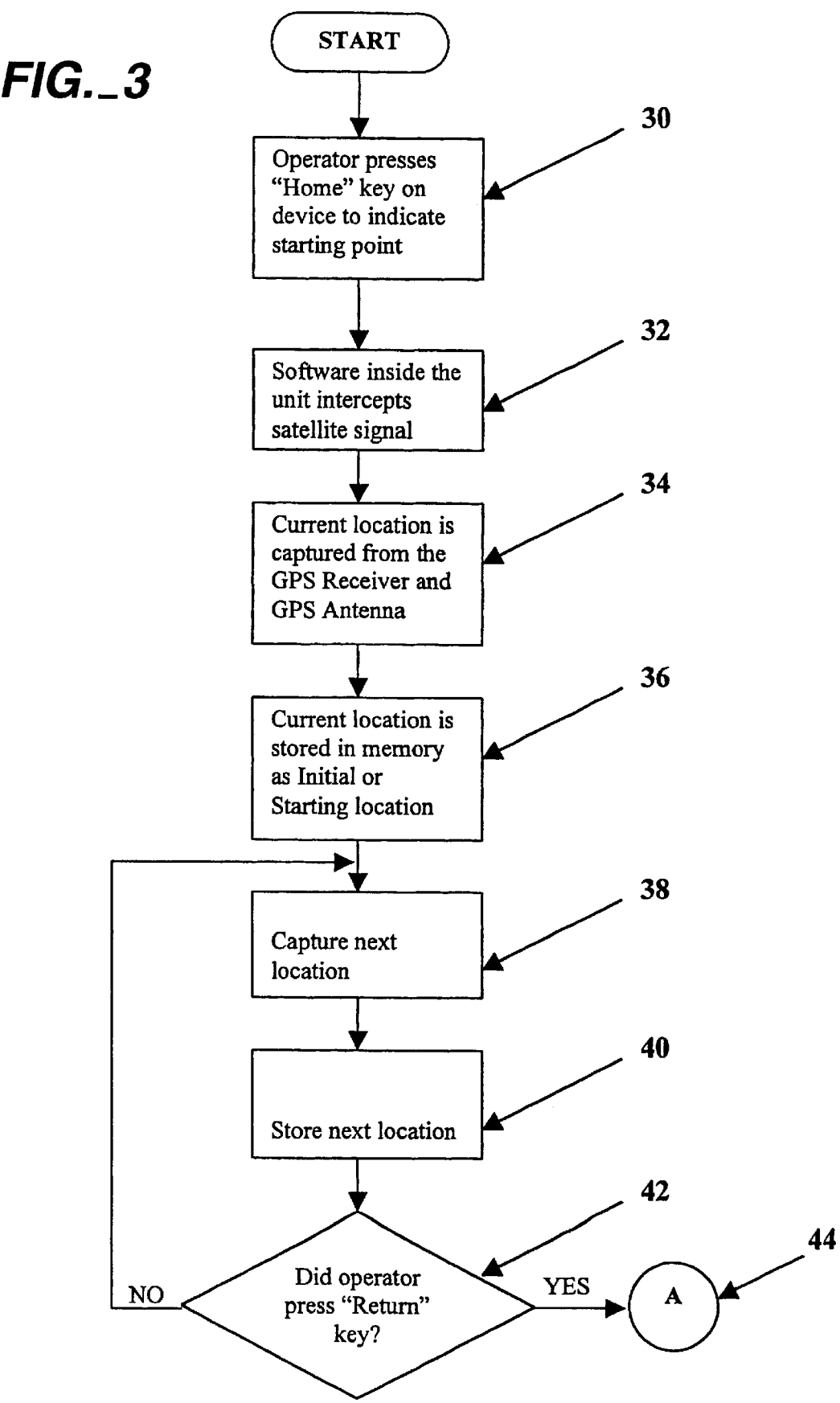
FIG._3

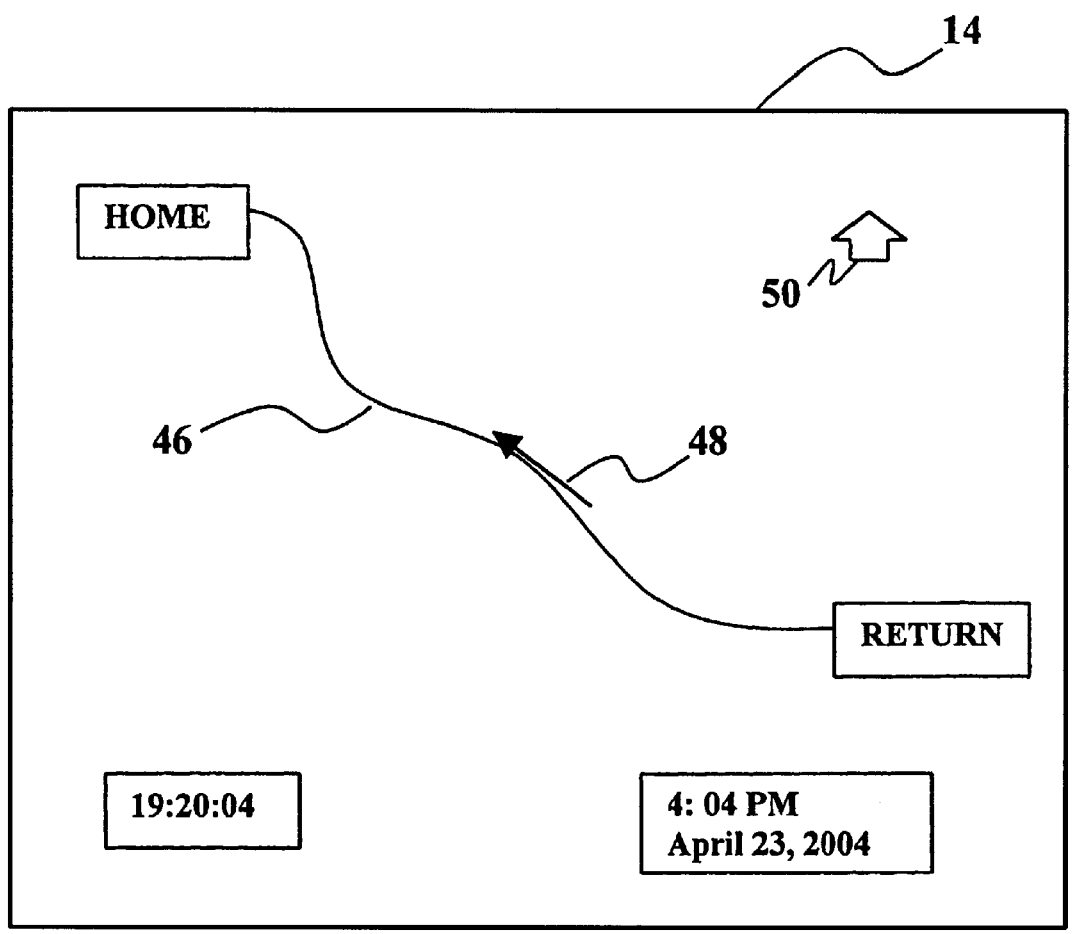
FIG._4

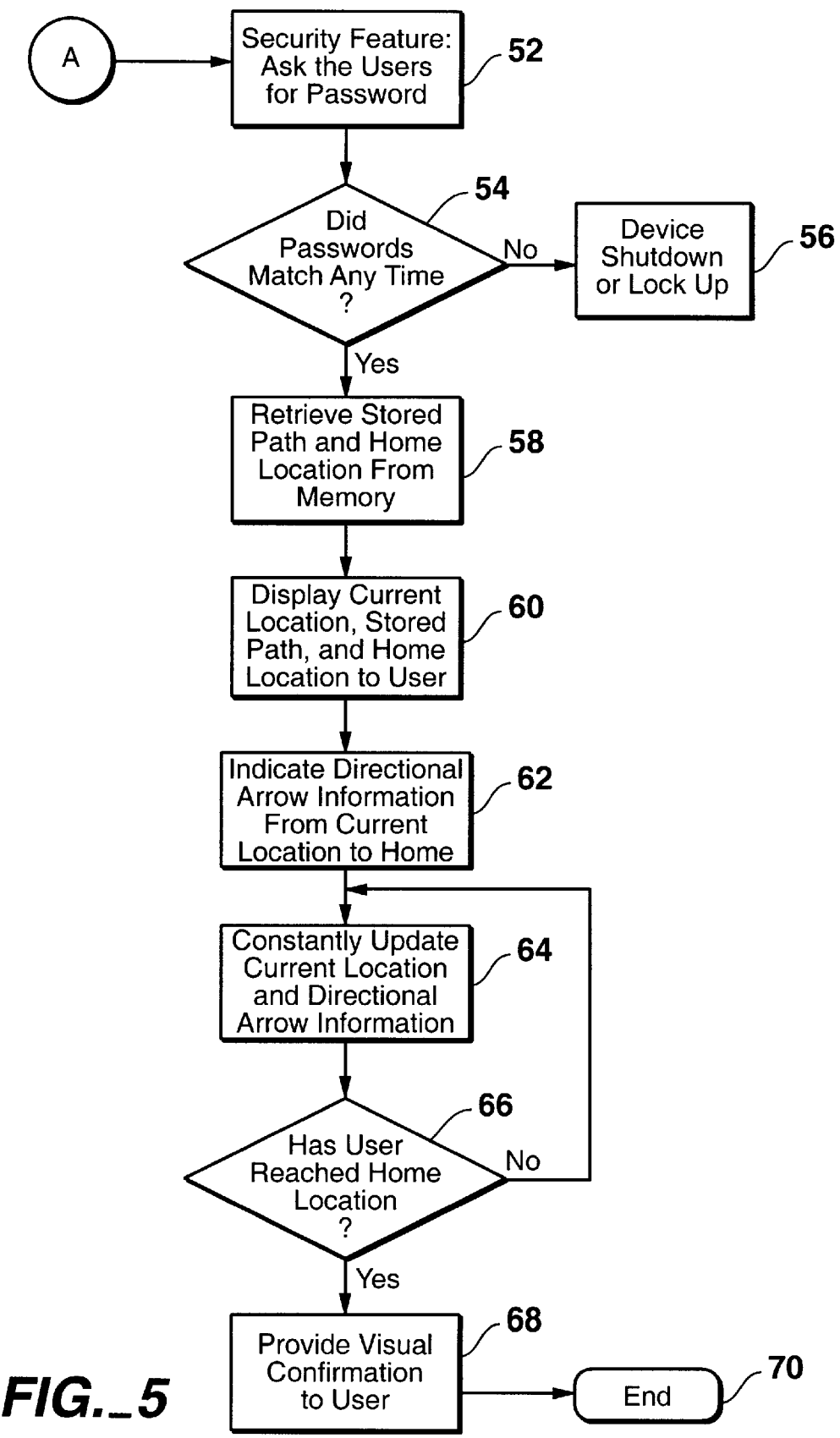
FIG._5

SYSTEM FOR DETERMINING AND TRACKING CHANGES IN LOCATION

CROSS-REFERENCE TO RELATED APPLICATIONS (Not applicable)

BACKGROUND OF THE INVENTION

1. Field of the Invention

The invention relates to navigational devices, and more particularly, to a portable device for determining and tracking changes in location.

2. Description of Related Art

Navigational aids have been in existence since time immemorial, varying in sophistication and advancing in step with scientific discovery. Recently, the Global Positioning System (GPS) has enabled a plethora of tools and navigational devices, many of which have become available for use by the public at large. GPS uses information based on the location of artificial satellites orbiting the earth. Combinations of such satellites are used to provide an accurate reading of the location of a navigational device in communication therewith.

BRIEF SUMMARY OF THE INVENTION

In accordance with the invention, a handheld device for guiding an operator from a Return location back to a Home location includes an input means, a processor, a GPS receiver, and a display. Using the input means, an operator prompts the device to determine and store the Home location. The processor then automatically, at predetermined time intervals, determines and stores intermediate locations of the device until the operator prompts the determination of the Return location. The processor then causes the display device to display a representation of the relative positions of the Home and Return locations in the form of a curve corresponding to the path taken by the operator in transporting the handheld device. The processor further determines and displays indications of the relative elevations of the Home and Return locations, along with an indication of the real time position of the device relative to the Home location.

In accordance with the invention, a method for guiding an operator from a Return location to a Home location includes determining the Home location using GPS, storing the home location, determining the Return location using GPS, determining one or more intermediate locations at predetermined intervals after determining the Home location, and visually displaying the relative positions of the Home, Return and intermediate locations.

BRIEF DESCRIPTION OF THE SEVERAL VIEWS OF THE DRAWING(S)

Many advantages of the present invention will be apparent to those skilled in the art with a reading of this specification in conjunction with the attached drawings, wherein like reference numerals are applied to like elements and wherein:

FIG. 1 is a schematic view of a locator device in accordance with the invention;

FIG. 2 is a schematic diagram of the components of a locator device in accordance with the invention;

FIG. 3 is a flow diagram of an acquisition mode of the locator device in accordance with the invention;

FIG. 4 is a schematic view of a display of the locator device in accordance with the invention; and FIG. 5 is a flow diagram of the a display mode of the locator device in accordance with the invention.

DETAILED DESCRIPTION OF THE INVENTION

FIG. 1 shows a handheld locator device 10 in accordance with the invention. Handheld device 10 comprises a housing 12 having a display device 14, preferably a liquid crystal display (LCD) or the like. Housing 12 is also provided with input means 16 comprising for example a plurality of push button keys 18.

FIG. 2 schematically shows the component arrangement which is contained within the housing 12. This arrangement comprises a GPS (Global Positioning System) receiver mounted on a GPS receiver circuit board 20 designed to receive GPS signals transmitted from artificial satellites in accordance with the GPS system. Receiver board 20 is an off-the-shelf component comprising a printed circuit board and appropriate circuit devices (not shown) for detecting and outputting electromagnetic waves of prescribed frequency, such as those transmitted by orbiting satellites.

To improve reception by receiver board 20, a suitably tuned antenna 22 is provided. Antenna 22 is connected to receiver board 20 and may be mounted to at least partially protrude from housing 12.

Communicating with receiver board 20 is a CPU (Central Processing Unit) board 24. CPU board 24 contains a CPU or other electronic processor such as a microprocessor or other type of logic device (not show). Suitable memory devices, such flash or ROM (Read Only Memory) (not shown) are provided in support of CPU board 24. These memory devices store software instructions, in the form of software designated schematically at 26, as necessary to coordinate the interaction of the various components of locator device 10. It will be appreciated that the memory devices can be provided on a separate board and can be replaceable or upgradable as desired. Further, CPU board 24 itself can be provided as part of receiver board 20 depending on the particular application.

Locator device 10 is also provided with a display device controller, such as LCD controller 28, which receives signals from CPU board 24. In accordance with these signals, various outputs regarding device status and location, as explained below, are displayed on display device 14 for viewing by an operator.

To power the components of locator device 10, a power supply 30 is provided. Power supply 30 can be in the form of dry-cell batteries or a rechargeable battery pack or the like.

Locator device 10 operates in two modes: acquisition mode and display mode. The acquisition mode is further explained with reference to FIG. 3 and begins when device 10 is prompted by the operator to register the initial, starting location of device 10. To do this, the operator, in Step 30, presses a push button key 18 of input means 16, which key may for example be labeled "Home." In response, the CPU of CPU board 24, in Step 32, instructs the devices of receiver board 20, and in particular the GPS receiver thereof, to intercept radio signals from orbiting artificial satellites based on known GPS techniques. These techniques, whose detail is beyond the scope of the present invention, can include triangulation of signals from a plurality of satellites within communication range of device 10. From the intercepted signals, the location of the device 10 when the Home key 18 is pressed is determined by the GPS receiver of receiver board 20, in Step 34. This first location is then stored in memory for future use, as indicated by Step 36. Home key 18 can serve a dual function by also turning the device 10 on, and/or recalling the device from a power save mode. Alternatively, a separate, dedicated key (not shown) can be provided for turning the device on or off.

In the next step, Step 38, successive intermediate interceptions and location determinations are automatically made by device 10, and the information relating to these locations is also stored (Step 40) in memory. The successive interceptions and location determinations are made at prescribed intervals, for example every 10 seconds. In this manner, the handheld device 10 acquires a running record of its own location as it is transported by the operator.

At step 42, a decision is made as to whether a "Return" key 18 of input means 16 has been pressed. This decision is made after each location determination and storage (Steps 38, 40). The acquisition mode ends when it is determined that the Return key 18 has been pressed. The acquisition mode thus results in the capture of location information at discrete locations of the locator device 10.

In the display mode, the locator device 10 can be prompted to display, using display device 14, information derived from the activities of the acquisition mode. Specifically, as seen from FIG. 4, display device 14 can be instructed by the CPU to graphically plot a curve 46 corresponding to the locations acquired and stored during the acquisition mode. The display of the curve 46 on display device 14 can be prompted automatically when the Return key is pressed, or it can be prompted when a different, dedicated key, such as one labeled "Display" (not shown), is pressed. The plotted curve 46 corresponds to the path traveled by locator device 10 as the locator device was transported from the location at which the Home key was pressed to the location at which the Return key was pressed. The end portions of the curve so plotted can be labeled in the display as "Home" and "Return" or similarly designated by recognizable symbols. Because curve 46 graphically represents the path of the locator device 10 between Home and Return locations, it can be used by the operator to retrace the steps of the operator between these two locations. To that end, an arrow 48 can be displayed which indicates the direction of travel the operator should take in order to return to the Home location. Thus, during the display mode, the location of the device 10 is constantly updated, with recurring interceptions and intermediation location determinations, to provide an indication of the progress of the operator in retracing his/her steps to the Home location. The information provided by arrow 48 is tied to the most recent of the intermediate locations and thus can change as the location changes, with the position and orientation of arrow 48 in display 14 corresponding to the most recent of the intermediate locations.

One application for the system of the invention can be in conjunction with parking a vehicle in a large parking lot. Upon exiting the vehicle, the operator presses the Home key, and then, when the operator is ready to return to the vehicle, the operator presses the Return key, causing device 10 to display a curve corresponding to the path traveled. From such a display the operator can navigate his/her way back to the parked vehicle. Device 10 can also display, in real time, the coordinates of its location. Additionally, device 10, using known GPS techniques, can provide an indication of the relative heights of the Home and Return locations, as when a vehicle is parked in a multi-level parking garage. An arrow 50, pointing up or down and constantly updated as discussed above with respect to arrow 48, can be used for this purpose, and would serve to inform the operator that to return to the Home location, the operator has to retrace his/her path along the curve 46 and also has to ascend or descend to the level of the Home location.

Display 14, along with keys 18 of input means 16, can be provided with suitable illumination means (not shown) in order to facilitate viewing in compromised lighting situations. Additionally, device 10 can be configured to provide a time and/or date indication, along with an indication of the current location identified, for instance, by its coordinates.

In accordance with the invention, information accessibility through device 10 can be restricted, as by use of passwords, for purposes of security. For instance, in order to prevent an unauthorized user from locating a vehicle belonging to the owner of device 10, which may be found and/or stolen along with the vehicle's keys, an authentication protocol can be utilized. Such a protocol is described with reference to FIG. 5, wherein, in step 52 (which, for purposes of illustration, continues from step 44 of FIG. 3 as indicated at A), the user is prompted to enter a password through input device 16. At decision 54, it is determined whether the password is correct, and after a prescribed number of attempts, failure leads to device shutdown or lockup, designated 56. If authentication is successful, then at Step 58, the stored locations corresponding to the path of the user, along with the home location, are retrieved from memory. At Step 60 these and the Home location are displayed by display 14. At Step 62, arrows 48 and 50 are displayed, indicating respectively the direction of travel and the relative elevation between the Home and Return locations. At Step 64, an information update is performed. Step 66 indicates a comparison operation, performed by the CPU, between the current location and the Home location. If these match, confirmation can be provided to the user, either visually through display 14, or audibly for instance through another means (not shown). Step 68 indicates this confirmation. If no match has occurred, then another update is performed, with the process returning to Step 64 for this purpose. This is repeated until the Home location is reached, and the process ends at 70.

The above are exemplary modes of carrying out the invention and are not intended to be limiting. It will be apparent to those of ordinary skill in the art that modifications thereto can be made without departure from the spirit and scope of the invention as set forth in the following claims.

I claim:

1. A handheld locator device for guiding an operator from a Return location to a Home location, the locator device comprising:

a Global Positioning System (GPS) receiver;

input means for prompting the GPS receiver to determine the location of the locator device at the Home and Return locations without resort to a remote database, based on input from the operator at the Home and Return locations;

memory for storing a plurality of locations determined by the GPS receiver, including the Home location, and for automatically storing one or more intermediate locations;

a display device; and a processor for retrieving stored locations, including the Home location and the one or more intermediate locations, from memory and for causing the display device to display a graphical representation of the relative positions of the retrieved stored locations, the graphical representation including a curve plotting at least some of the stored locations, including the Home location, such that a path traveled by the locator device is visually displayed.

2. The device of claim 1, wherein the processor determines the relative elevations of the Home and Return locations and causes the display to display an indication of the relative elevations.

3. The device of claim 1, wherein the processor causes the display device to display an indication of the direction and location of a most recent of the intermediate locations relative to the Home location.

4. The device of claim 1, wherein the processor determines the relative elevations of the Home location and a most recent of the intermediate locations, and causes the display to display an indication of the relative elevations.

5. The device of claim 1, wherein the processor performs an authentication protocol before prompting the display device to display a graphical representation of the relative positions of the intermediate locations.

6. The device of claim 5, wherein the authentication protocol includes password verification.

7. A method for guiding an operator from a Return location to a Home location, the method comprising:

determining the Home location using Global Positioning System (GPS) based on an input prompt from the operator;

storing the home location;

determining the Return location using GPS based on an input prompt from the operator;

determining one or more intermediate locations at predetermined intervals after determining the Home location; and visually displaying the relative positions of the Home, Return and intermediate locations using a graphical representation including a curve plotting at least some of the stored locations, including the Home location, such that a path traveled by the locator device is indicated, wherein determining the Home, Return and intermediate locations is conducted without resort to a remote database.

8. The method of claim 7, further comprising determining relative elevations of the Home location and/or the intermediate locations.

9. The method of claim 7, further comprising displaying an indication of the direction and location of a most recent of the intermediate locations relative to the Home location.

10. The method of claims 7, further comprising performing an authentication protocol before visually displaying the relative positions of the Home, Return and intermediate locations.

11. The method of claim 10, wherein the authentication protocol includes password verification.

* * * * *